United States Patent [19]

Minovitch

[11] Patent Number: 5,103,712
[45] Date of Patent: Apr. 14, 1992

[54] AMMUNITION RELOADING SYSTEM AND OPERATING METHOD

[76] Inventor: Michael A. Minovitch, 2832 St. George St. #6, Los Angeles, Calif. 90027

[21] Appl. No.: 688,853

[22] Filed: Apr. 22, 1991

[51] Int. Cl.$^5$ .......................... B64D 1/04; B65G 17/00
[52] U.S. Cl. .................... 89/1.11; 89/40.07; 244/137.1; 198/804
[58] Field of Search .......... 244/137.1, 135 A; 198/804; 89/33.14, 33.2, 40.07, 1.11

[56] References Cited

U.S. PATENT DOCUMENTS

| | | | |
|---|---|---|---|
| 2,692,121 | 10/1954 | Brown | 244/137.1 |
| 2,891,448 | 6/1959 | Henström et al. | 89/46 |
| 3,139,798 | 7/1964 | Aldrin | 89/46 |
| 3,167,278 | 1/1965 | Roberge | 244/137.4 |
| 4,398,685 | 8/1983 | Task et al. | 244/135 A |
| 4,601,389 | 7/1986 | Minovitch | 198/804 |
| 4,633,376 | 12/1986 | Newman | 244/135 A |

*Primary Examiner*—David H. Brown
*Attorney, Agent, or Firm*—Christie, Parker & Hale

[57] ABSTRACT

An aerial inflight reloading system and operating method is provided for military combat aircraft using cannon or machine gun ammunition. In this system, a large ammunition carrying aircraft is equipped with an enclosed conveyor fitted with aerodynamic lifting and control surfaces. A controller, positioned in a pod mounted under the rear portion of the aircraft's fuselage, maneuvers the conveyor via flight controls. The conveyor is guided by the controller to a combat receiver aircraft flying behind and somewhat below the supply aircraft, and is connected to a receptacle mounted on the receiver aircraft. After the connection is made, ammunition is transferred from the supply aircraft to the receiver aircraft via the conveyor. The system enables combat aircraft to be reloaded with ammunition while flying close to a combat zone instead of having to return to base to reload. By combining this system with aerial refueling, it will be possible for combat aircraft to spend significantly longer time periods firing on enemy targets before returning to base, thus significantly increasing their operational efficiency.

7 Claims, 5 Drawing Sheets

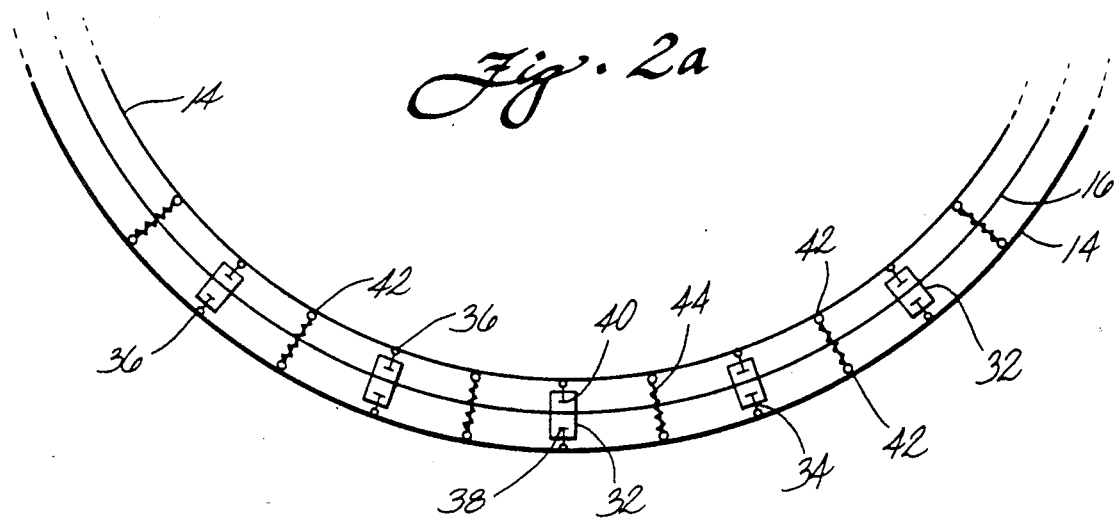
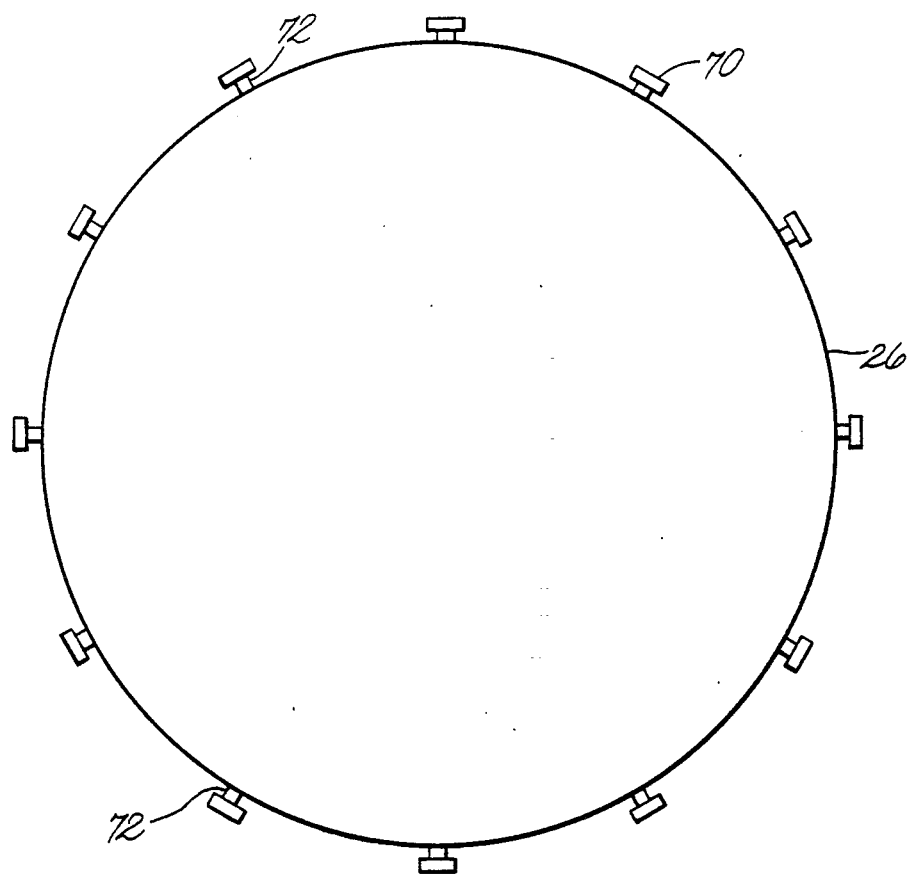

AMMUNITION RELOADING SYSTEM AND OPERATING METHOD

BACKGROUND

The recent war in the Persian Gulf has shown that the General Electric GAU-8 30 mm multi-barreled cannon, mounted in the nose of the Fairchild Republic A-10 aircraft, is one of the most effective weapon systems for destroying enemy tanks. But the rate of fire of this weapon is so high (4,200 rounds/min), the supply of ammunition carried by the aircraft is quickly exhausted. When this happens, the aircraft must leave the combat area and return to base to reload. Since the base is usually located a long distance from the battlefield, most of a mission's flight time is spent flying to and from the battlefield. The time spent firing on enemy targets before running out of ammunition is a very small fraction of the total flight time.

The present invention provides a system and operating method wherein cannon or machine gun ammunition can be transferred from a supply aircraft to a combat aircraft while flying close to a battlefield. By using this invention, along with aerial refueling, combat aircraft such as the A-10, (or helicopter gun ships) will be able to destroy vast numbers of targets on each mission because they will be given an essentially inexhaustible supply of ammunition and fuel.

BRIEF SUMMARY OF THE INVENTION

With the foregoing in mind, the present invention provides an aerial reloading system for cannons or machine guns used on combat aircraft. In the preferred embodiment, the system comprises a conveyor enclosed within a rigid tube mounted on the rear of an ammunition supply aircraft. Wings with movable control surfaces are mounted on the tube to enable the conveyor to be maneuvered in flight by an operator inside a pod mounted below the rear fuselage. The flying conveyor is guided by the controller to a combat aircraft flying in formation behind, and somewhat below the supply aircraft, and is connected to a receptacle mounted on the receiver aircraft. The receiver aircraft is equipped with a relatively short flexible conveyor that feeds the incoming ammunition to a magazine thus reloading the weapon system on the combat aircraft while flying close to a battlefield.

DRAWINGS

These and other advantages and features of the invention will be apparent from the disclosure, which includes the specification with the foregoing and ongoing description, the claims, and the accompanying drawing wherein:

FIG. 2A is an enlarged transverse cross-section of a portion of the flying conveyor further illustrating its design and construction;

FIG. 4A is an enlarged transverse cross-section of the flying conveyor further illustrating its mounting inside the supply aircraft;

DESCRIPTION OF THE PREFERRED EMBODIMENT

The development of aerial refueling, pioneered by Boeing Aircraft Corporation during the 1940s, enables combat aircraft to be refueled in flight from a tanker aircraft. This enables combat aircraft to remain flying almost indefinitely, significantly extending their operational range. But the possibility of resupplying live ammunition for combat aircraft after it is expended on enemy targets while in flight is never mentioned in the prior art. However, such a system would significantly increase the operational efficiency of combat aircraft. The invention described herein will provide this system.

Figure 1:
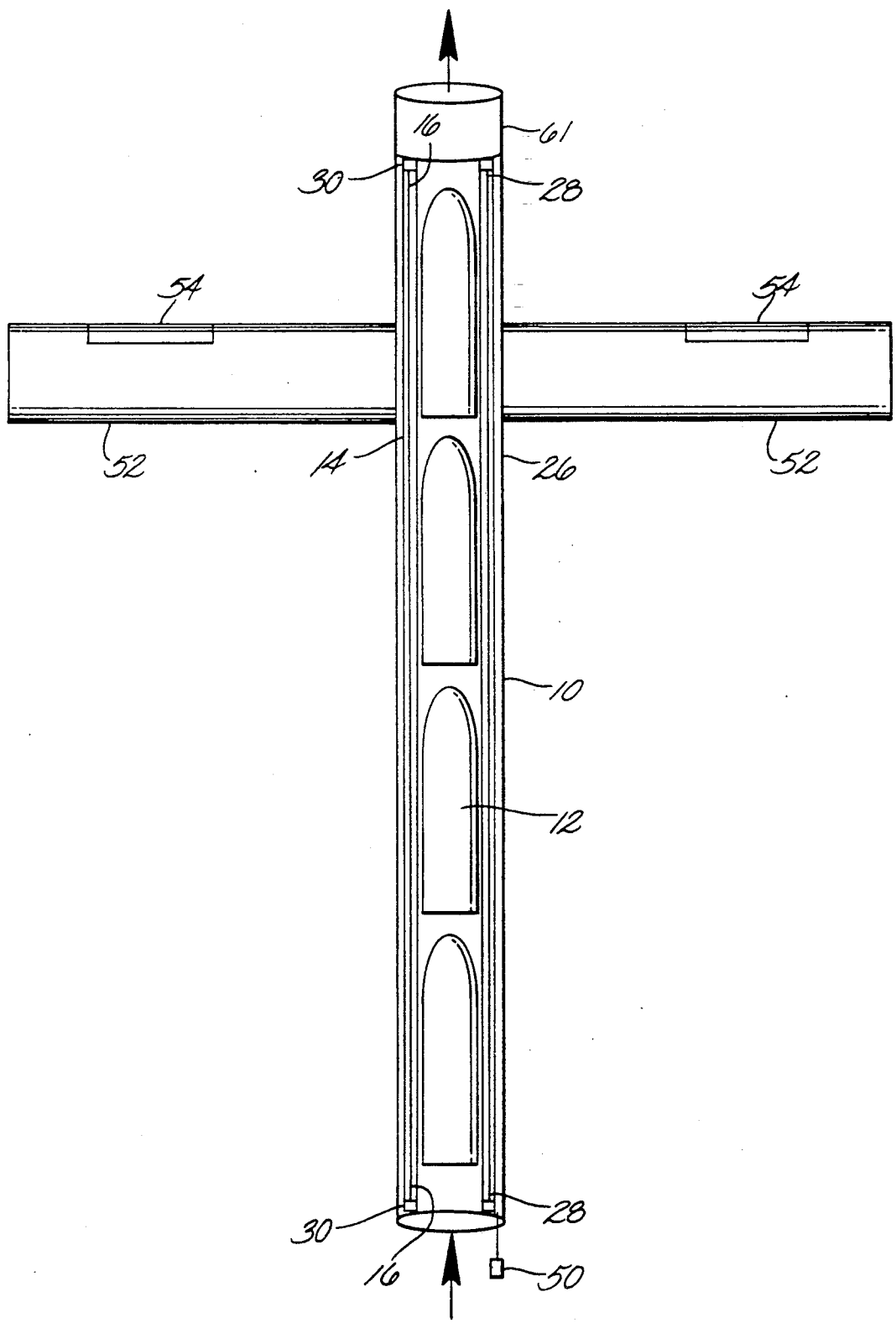
FIG. 1 is a schematic longitudinal cross-section of a flying conveyor illustrating the movement of individual rounds of ammunition from a supply aircraft to a receiver aircraft.
Figure 2:
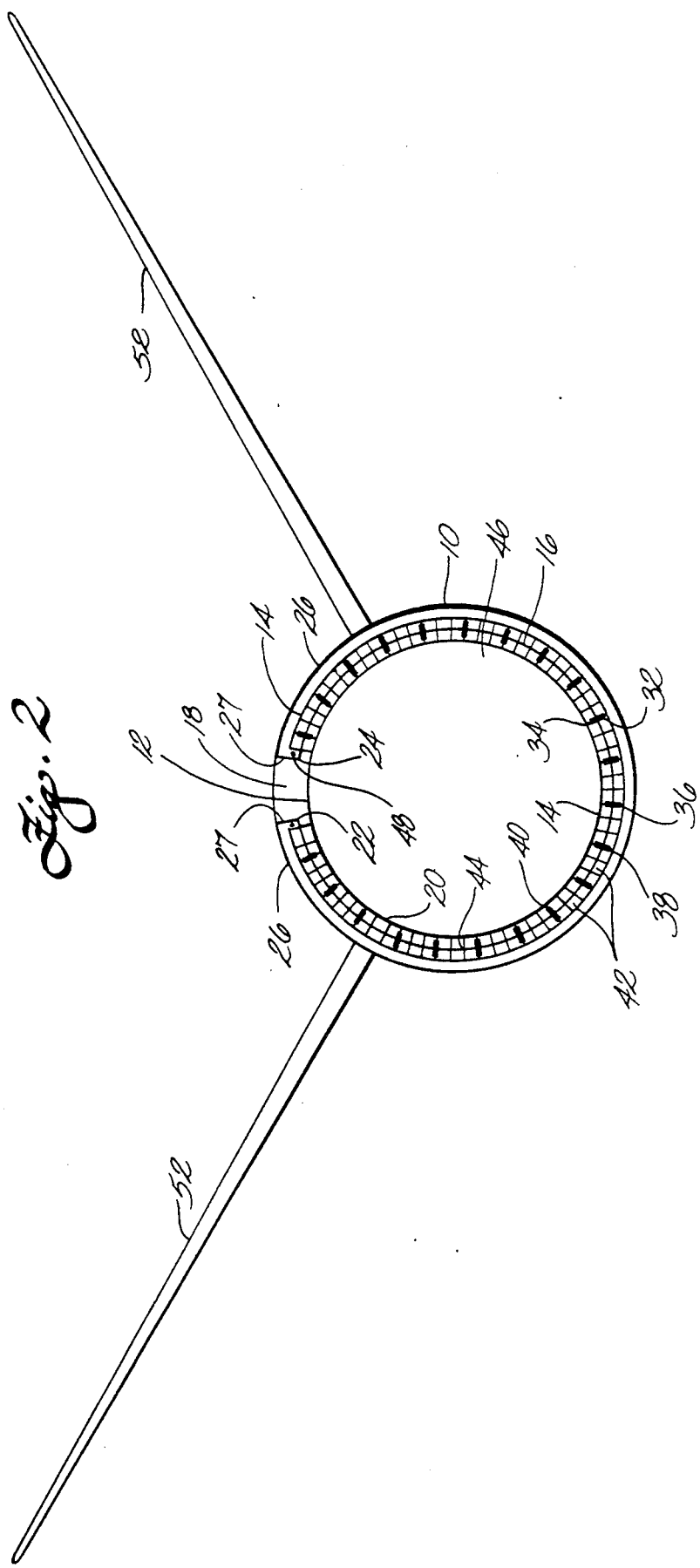
FIG. 2 is a schematic transverse cross-section of the flying conveyor further illustrating its design and construction.

FIGS. 1 and 2 describe schematic longitudinal and transverse cross-sections respectfully, of an enclosed flying tubular conveyor 10 mounted under the rear portion of an ammunition supply aircraft. Live ammunition 12 (such as 30 mm cannon shells) is moved through the conveyor 10 by means of an endless flexible belt 14 having a nearly circular transverse cross-section. The belt 14 moves continuously around a rigid inner guide tube 16. As is illustrated in FIG. 2, the guide tube 16 has a circular cross-section with an open slot 18 extending longitudinally along its upper portion such that the inside portion 20 of the belt 14 forms a duct that raps approximately 350° around the ammunition 12. The two longitudinal edges 22, 24 of the guide tube 16 on each side of the slot 18 are connected to an outer tube 26 via flanges 27 which encloses the conveyor 10.

Referring to FIGS. 2 and 2A, the moving belt 14 passes around each end 28 of the guide tube 16 on a plurality of rollers 30 (FIG. 1). The guide tube 16 is fitted with a plurality of relatively narrow parallel guide tracks 32 that protrude a short distance from each side. These guide tracks 32 have narrow slots 34 that extend longitudinally along the upper surfaces. A plurality of tension bearing bands 36 are embedded in the moving belt 14 containing small sliders 38 with flanged ends 40. These sliders 38 ride snugly inside the guide slots 34 and keep the moving belt 14 close to the walls of the guide tube 16. A plurality of rollers 42 are mounted on each side of the guide tube 16 between the guide tracks 32 which provide a low-friction circular roller bed for the moving belt 14. These rollers 42 are mounted on springs 44 that push the belt 14 a small distance away from the guide tube 16. The design is such that when a shell 46 is carried through the conveyor 10 by the moving belt 14, (FIG. 1) the belt 14 pushes inward against the shell 350° around its transverse periphery thereby preventing it from sliding over the belt surface when the conveyor 10 is sloping downward toward a receiver aircraft.

As shown in FIGS. 1 and 2, the rollers 30 mounted on each end of the guide tube 16 are driven by two rotating drive shafts 48 extending longitudinally along the guide tube on each side of the slot 18. The driving rollers 30 are connected to the drive shafts 48 via worm-gear coupling systems. Some of the rollers 42 mounted along the conveyor 10 on the inside of the guide tube 16 pushing the belt 14 up against the shells 12, are also driven by the rotating drive shafts 48 via worm-gear coupling systems. The drive shafts 48 are rotated by electric motors 50 mounted at the beginning of the conveyor 10 located inside the supply aircraft. These driving rollers 30, 42, enable ammunition to be moved in either direction through the conveyor 10 when conveyor 10 is sloping at any angle.

Figure 3:
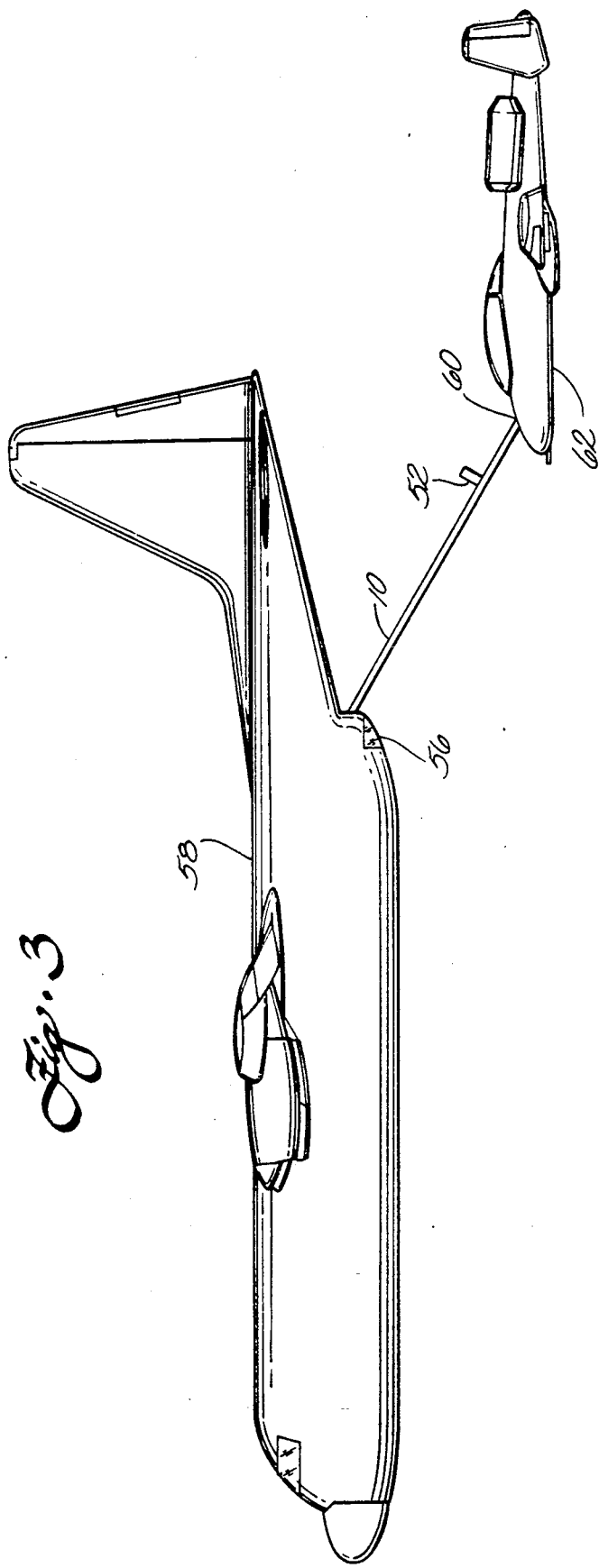
FIG. 3 is a schematic view showing an ammunition supply aircraft feeding ammunition into a combat aircraft via the flying conveyor.

The conveyor 10 is fitted with small aerodynamic V-shaped wings 52 that are mounted on the outer tube 26. These wings 52 are equipped with movable aerodynamic control surfaces 54. Referring to FIG. 3, an operator positioned inside a small pod 56 located under the fuselage of the supply aircraft 58 maneuvers the conveyor 10 via the aerodynamic control surfaces 54 to a receptacle 60 mounted on a combat aircraft 62 flying a short distance behind and below the supply aircraft 58. The conveyor 10 is mounted such that it can extend and retract a short distance inside the body of the supply aircraft. When the operator aligns the conveyor 10 opposite the receptacle 60, the conveyor 10 is extended a short distance and connected via a coupling system 61 to the receptacle 60. The design of the wings 52 movable control surfaces 54, the maneuvering system for the conveyor 10 and the coupling system 61 are essentially identical to that used on Boeing's "Flying-Boom" system used for aerial refueling (see *The Aircraft year Book*, 1949, Lincoln Press, Inc., Washington, D. C., pp. 92-94).

Figure 4:
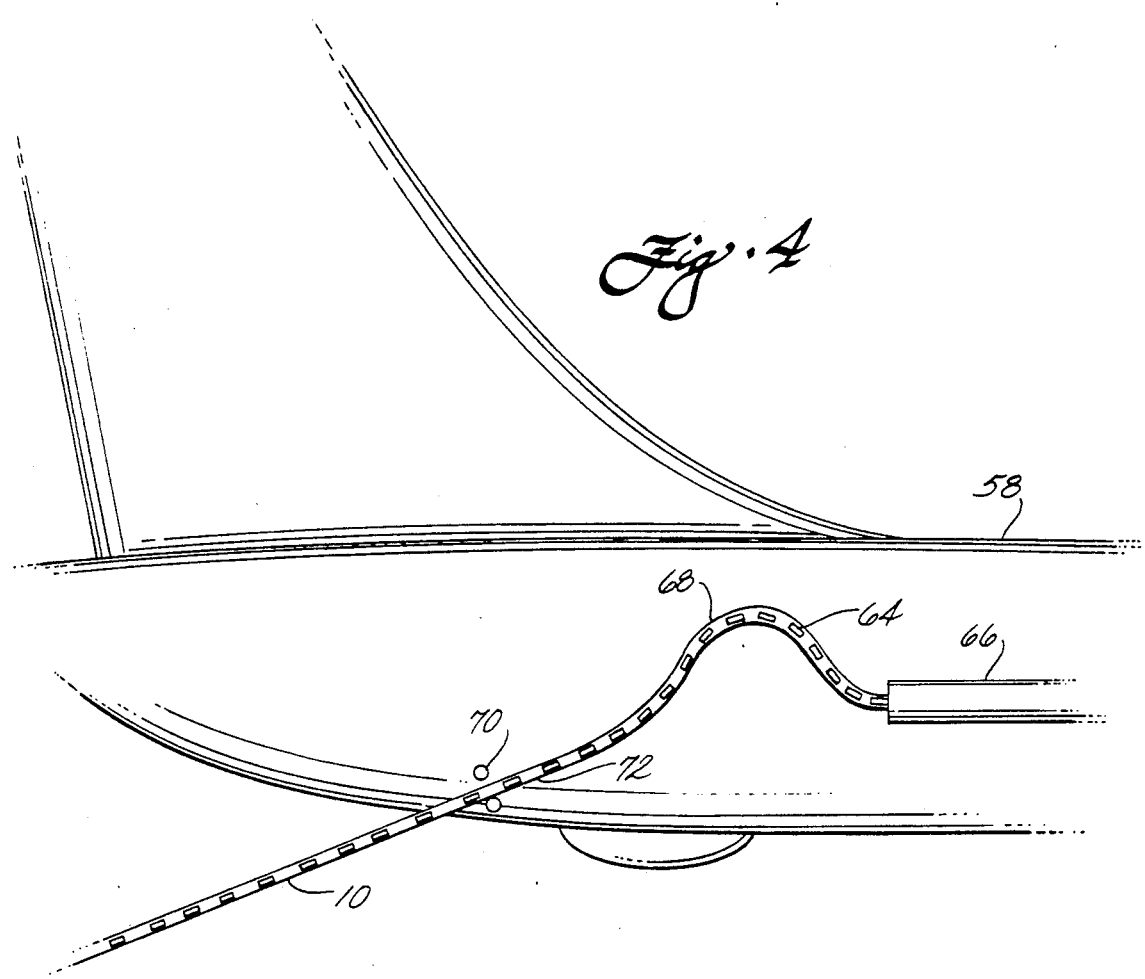
FIG. 4 is a schematic longitudinal cross-section illustrating how ammunition stored in magazines mounted inside the supply aircraft is fed into the flying conveyor for transfer into the receiver aircraft.
Figure 5:
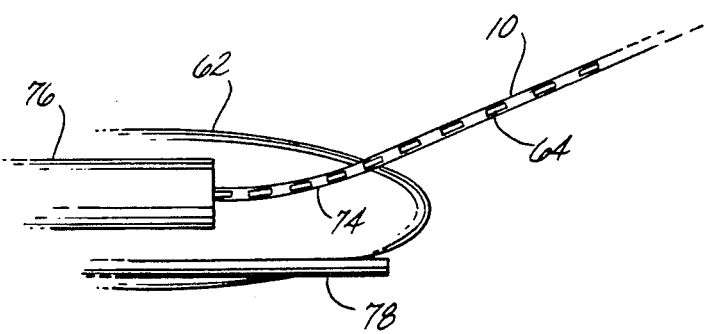
FIG. 5 is a schematic longitudinal cross-section showing the connection between the flying tubular conveyor and a short flexible conveyor mounted inside the receiver aircraft that feeds the incoming ammunition into a magazine.

As is shown in FIG. 4, ammunition 64 is transferred from a large storage magazine 66 in the supply aircraft 58 and fed into the flying conveyor 10 via a small flexible tubular conveyor 68. This feeding conveyor 68 is similar to that described in my U.S. Pat. No. 4,601,389 filed Sept. 17, 1984 entitled "Tubular Conveyor System and Operating Method". The tubular conveyor 68 is mounted with slack to enable the flying conveyor 10 to be extended or retracted longitudinally via driving gears 70 and small rails 72 (FIGS. 4 and 4A) which comprises the mounting system for the flying conveyor 68 inside the supply aircraft 58. The ammunition 64 fed into the flying conveyor 10 is transferred into the receiver aircraft 62 (FIG. 5) via another flexible tubular conveyor 74. This conveyor 74 carries the incoming live ammunition 64 to a magazine 76 thereby reloading the magazine 76. The ammunition is fired in a gun 78 adjacent the magazine 76. The feeding conveyors 68 and 74 are flexible so that small movements of the flying conveyor 10 relative to the aircraft will not jam the movement of ammunition.

The reloading system can be designed to operate at 5 shells per second. Therefore, at this rate, A-10 aircraft using 30 mm cannon shells with 1,350 round magazines could be completely reloaded in 270 sec (4.5 minutes). The combat aircraft could be reloaded with ammunition several times in one mission. For example, aerial tanker aircraft and aerial reloading aircraft could fly continuously in a holding pattern near a ground combat zone. When a combat aircraft runs out of ammunition and/or fuel, it simply rendezvous with the reloading and/or tanker aircraft and returns to the battlefield to deliver the ordinance on large numbers of enemy targets. In this way, the potential firepower of only one combat aircraft can become equal to that of an entire squadron—and, the fire-power of a squadron would become equal to that of an entire group.

Many different embodiments of the invention are possible. These embodiments can include systems designed for aerial reloading of self-propelled missiles, rockets and/or other types of ordnance. The system would also be used for many different types of aircraft. Large helicopters could also be used as ammunition supply helicopters. In this embodiment, small helicopter gun ships using rapid-fire ammunition could be reloaded close to a battlefield. Thus, in this disclosure, the term "aircraft" means fixed wing aircraft or helicopters.

From the foregoing description, it will thus be evident that the present invention provides a vastly improved method for reloading combat aircraft (and helicopters) engaged in battlefield operations. As various changes and modifications can be made in the above system and operating method without departing from the spirit or scope of the invention, it is intended that all matter contained in the above description or shown in the accompanying drawings, should be interpreted as illustrative and not in a limiting sense.

What is claimed is:

1. A method for reloading combat aircraft with ammunition comprising the steps of:
   storing ammunition inside a supply aircraft;
   mounting a conveyor means having a moving endless conveying surface on said supply aircraft;
   enclosing said conveyor means inside a tubular structure;
   mounting aerodynamic lifting surfaces on said tubular structure such that a portion of the weight of said conveyor means is supported by aerodynamic forces;
   mounting aerodynamic control surfaces on said lifting surfaces such that said conveyor means can be maneuvered while in flight;
   flying said ammunition carrying supply aircraft in the vicinity of said combat aircraft;
   connecting said conveyor means to said combat aircraft; and
   transferring ammunition from said supply aircraft to said combat aircraft via said conveyor means while said aircraft are in flight.

2. A method as set forth in claim 1 further comprising the steps of:
   mounting an ammunition storage magazine in said supply aircraft and in said combat aircraft; and
   mounting ammunition feeding conveyor means in said combat aircraft and in said supply aircraft such that ammunition stored in said supply aircraft magazine is fed into said conveyor means connecting said aircraft, and such that ammunition entering said combat aircraft from said connecting conveyor means is transferred into said combat aircraft magazine via said feeding conveyor means.

3. An aerial reloading system for combat aircraft comprising:
   ammunition storage means mounted in an ammunition supply aircraft;
   conveyor means having a moving endless conveying surface mounted on said ammunition supply aircraft;
   means for mounting said conveyor means inside a tubular structure;
   means for connecting said conveyor means to said combat aircraft while said aircraft are in flight; and means for transferring ammunition from said supply aircraft to said combat aircraft via said conveyor means.

4. A system as set forth in claim 3 further comprising means for driving said conveyor means with electric motor means mounted inside said supply aircraft such that ammunition can be moved in either direction through said conveyor means.

5. A system as set forth in claim 3 further comprising:
ammunition storage means mounted inside said combat aircraft; and
flexible tubular conveyor means mounted between said ammunition storage means and said conveyor means connecting said aircraft such that ammunition can be conveyed from said supply aircraft to said combat aircraft through said flexible tubular conveying means without jamming while said conveyor means connecting said aircraft moves in different directions relative to said aircraft.

6. A system as set forth in claim 3 further comprising aerodynamic lifting surfaces mounted on said conveyor means such that a portion of the weight of said conveyor means is supported by aerodynamic forces when said conveyor means is maneuvering in the vicinity of said combat aircraft.

7. A system as set forth in claim 6 further comprising means for maneuvering said conveyor means while said supply aircraft is flying in the vicinity of said combat aircraft.

* * * * *